United States Patent
Majima et al.

(10) Patent No.: US 6,600,998 B1
(45) Date of Patent: Jul. 29, 2003

(54) CATALYST DETERIORATING STATE DETECTING APPARATUS

(75) Inventors: Yoshihiro Majima, Inuyama (JP); Yukihiro Yamashita, Takahama (JP); Noriaki Ikemoto, Kariya (JP)

(73) Assignee: Denso Corporation, Kariya (JP)

( * ) Notice: Subject to any disclaimer, the term of this patent is extended or adjusted under 35 U.S.C. 154(b) by 293 days.

(21) Appl. No.: 09/680,438

(22) Filed: Oct. 6, 2000

(30) Foreign Application Priority Data

Oct. 14, 1999 (JP) .......................................... 11-291846

(51) Int. Cl.⁷ ............................................. G06F 13/00
(52) U.S. Cl. ......................... 702/24; 702/27; 702/184; 702/188
(58) Field of Search ................................ 702/184, 188, 702/27, 24; 60/276, 277; 701/109

(56) References Cited

U.S. PATENT DOCUMENTS

| | | | |
|---|---|---|---|
| 5,622,047 A | 4/1997 | Yamashita et al. | 60/274 |
| 5,758,491 A | 6/1998 | Agustin et al. | 60/274 |
| 5,784,879 A | 7/1998 | Dohta et al. | 60/276 |
| 5,839,415 A * | 11/1998 | Suzuki et al. | 123/491 |
| 5,851,376 A * | 12/1998 | Nishioka et al. | 205/784.5 |
| 6,073,440 A | 6/2000 | Douta et al. | 60/277 |
| 6,085,518 A * | 7/2000 | Yamashita et al. | 60/278 |
| 6,327,849 B1 * | 12/2001 | Sugiura et al. | 60/277 |

FOREIGN PATENT DOCUMENTS

JP          A-6-10738          1/1994

* cited by examiner

Primary Examiner—Marc S. Hoff
Assistant Examiner—Felix Suarez
(74) Attorney, Agent, or Firm—Nixon & Vanderhye P.C.

(57) ABSTRACT

If conditions for measuring a storage quantity of $O_2$ in a catalyst are satisfied, a target air-fuel ratio is switched to a rich value after the end of a fuel-cut state. The quantity of a rich component contained in an exhaust gas flowing into a catalyst during a period of time period is calculated. The quantity of a rich component required to consume all $O_2$ absorbed by the catalyst in the fuel-cut state is calculated. The computed quantity of a rich component is taken as a storage quantity of $O_2$ in the catalyst. Since the air-fuel ratio of exhaust gas is changed to a rich value, to improve exhaust gas cleaning, during the computation of a storage quantity of $O_2$, the storage quantity of $O_2$ in the catalyst can be computed without worsening emission of exhaust gas.

19 Claims, 8 Drawing Sheets

CALCULATION OF O₂ ABSORPTION DURING FUEL-CUT

| EXHAUST GAS AMOUNT INTO CATALYST DURING FUEL-CUTOFF (g) | 10 | 20 | 30 | 40 | 50 | 60 |
|---|---|---|---|---|---|---|
| O₂ ABSORPTION (g) | 5 | 10 | 15 | 20 | 25 | 30 |

FIG. 7

SETTING TARGET AIR-FUEL RATIO

| O₂ STORAGE QUANTITY OF PREVIOUS RUN (g) | 2 | 5 | 7 | 10 | 15 | 20 |
|---|---|---|---|---|---|---|
| TARGET AIR-FUEL RATIO | 14.3 | 14 | 13.7 | 13.5 | 13 | 12.5 |

FIG. 8

CORRECTION OF TARGET AIR-FUEL RATIO

| AIR INTAKE AMOUNT (g/s) | 2 | 4 | 6 | 8 | 10 | 12 |
|---|---|---|---|---|---|---|
| CORRECTION COEFFICIENT | 1 | 1 | 0.98 | 0.95 | 0.9 | 0.85 |

CLOSE TO STOICH →

FIG. 9

CORRECTION OF AIR-FUEL RATIO FEEDBACK GAIN

| AIR INTAKE AMOUNT (g/s) | 2 | 4 | 6 | 8 | 10 | 12 |
|---|---|---|---|---|---|---|
| CORRECTION COEFFICIENT | 1 | 1 | 1.02 | 1.05 | 1.10 | 1.15 |

INCREASING FEEDBACK GAIN →

CATALYST DETERIORATING STATE DETECTING APPARATUS

CROSS-REFERENCE TO RELATED APPLICATION

The present invention is related to Japanese patent application No. Hei. 11-291846, filed Oct. 14, 1999; the contents of which are incorporated herein by reference.

1. Field of the Invention

The present invention relates to a catalyst deteriorating state detecting apparatus, and more particularly to a catalyst deteriorating state detecting apparatus for determining a deteriorating state of a catalyst based on a storage quantity or the magnitude of saturated absorption of the catalyst.

2. Description of the Related Art

To detect a deteriorating state of a catalyst used for cleaning exhaust gas or detect a decrease in storage quantity of the catalyst, a dither period and the amplitude at a target air-fuel ratio are gradually increased and a deteriorating state or the storage quantity of the catalyst is determined based on the dither period and the amplitude. In response, a change in output is generated by an air-fuel ratio sensor provided on the downstream side of the catalyst. Such a device is disclosed in JP-A No. Hei7-1030309. Another method is disclosed in JP-A No. Hei6-17640. Here, while repeatedly alternately changing a target air-fuel ratio to rich and lean, a correction magnitude and a correction period of the target air-fuel ratio are increased gradually and a deteriorating state of the catalyst is recognized from computation of a storage quantity in the catalyst based on a correction magnitude and a correction period. This results in a change in output generated by an air-fuel ratio sensor provided on the downstream side of the catalyst.

With conventional methods, however, the storage quantity of a catalyst cannot be computed with a high degree of precision. Even for the same variation pattern of the target air-fuel ratio in calculating the storage quantity of a catalyst, the time change in output generated by an air-fuel ratio sensor provided on the downstream side varies with change in intake-air flow rate or variation in exhaust-gas flow rate. Thus, by calculating a catalyst storage quantity based on a dither period and an amplitude or a correction magnitude and a correction period, computation of storage quantity varies depending on the flow rate of intake air or the flow rate of exhaust gas. This reduces precision in detection of a deteriorating state of the catalyst.

In addition, to improve the efficiency exhaust gas cleaning processes during engine operation, the air-fuel ratio of the exhaust gas is controlled to a value close to the stoichiometric air-fuel ratio. In calculating the storage quantity of a catalyst, however, the air-fuel ratio is repeatedly changed toward rich and lean to change the downstream side air-fuel ratio toward rich and lean. As a result, conventional methods result in poor exhaust gas emissions.

SUMMARY OF THE INVENTION

It is thus a first object of the present invention to improve the precision of determining a catalyst's storage quantity.

It is yet another object of the present invention to allow the storage quantity of a catalyst to be computed or a deteriorating state of a catalyst to be detected without worsening emission of exhaust gas.

To accomplish these and other objects, a catalyst deteriorating state detecting apparatus is provided for calculating a catalyst storage quantity based on the flow rate of exhaust gas into the catalyst between a change in output generated by an upstream sensor and a change in output generated by a downstream sensor due to a variation in target air-fuel ratio. A deteriorating state determining means then determines whether a deteriorating state of the catalyst exists based on the storage quantity calculated by the storage amount computing means.

Here, the storage amount computing means calculates a storage quantity of a catalyst based on the flow rate of exhaust gas flowing into the catalyst during a change in output generated by the upstream sensor and a change in output generated by the downstream sensor, to eliminate the effect of a change in intake-air flow rate or a change in exhaust-gas flow rate during calculation. In another aspect of the invention, a storage quantity is calculated based on the flow rate of exhaust gas flowing into the catalyst during a change in output generated by an upstream sensor to a predetermined value and a change in output generated by a downstream sensor to another predetermined value. That is, during a change in output generated by the upstream sensor to a predetermined value and a change in output generated by the downstream sensor to another predetermined value, a rich-component quantity (or a lean-component quantity) flowing into the catalyst changes depending on the air-fuel ratio of exhaust gas besides the flow rate of intake air (or the flow rate of the exhaust gas). Thus, the storage quantity is calculated based on a change in exhaust-gas flow rate and a change in target air-fuel ratio.

In another aspect, a storage quantity is calculated by switching a target air-fuel ratio to a rich value right after the end of a fuel-cut state. That is, during a fuel-cut state, the air-fuel ratio of exhaust gas flowing into the catalyst is lean, causing the storage quantity of the catalyst to change to a lean value. Thus, a storage quantity is calculated by switching the air-fuel ratio of the exhaust gas to a rich value to improve the efficiency of exhaust gas cleaning. As a result, the storage quantity is calculated or a deteriorating state of the catalyst is detected without worsening emission of exhaust gas.

When the period of a fuel-cut state is a certain length, the amount of absorption of a lean component such as $O_2$ in the catalyst during the fuel-cut state becomes saturated, and the magnitude of the saturated absorption becomes the storage quantity of the catalyst. Thus, with the absorption magnitude of the lean component due to a fuel-cut state placed in saturated state, if the storage quantity is calculated from a flow rate of exhaust gas flowing into the catalyst during target air-fuel ratio switching to a rich value right after the end of the fuel-cut state and a point of time the air-fuel ratio on the downstream side of the catalyst reaches a stoichiometric air-fuel ratio value, a storage quantity of the catalyst computed with a high degree of precision can be obtained.

In light of the above, another aspect of the invention calculates a storage quantity of the catalyst right after the end of a fuel-cut state when the absorption magnitude of a lean component in the catalyst during the fuel-cut state has attained or exceeded a predetermined value or a saturated level. In this way, the storage quantity of the catalyst can be computed with a high degree of precision. According to another aspect of the invention, a storage quantity of the catalyst is calculated by setting the target air-fuel ratio at a new value dependent on a computed value of the storage quantity obtained in the immediately preceding calculation of the storage quantity. Here, if the target air-fuel ratio is increased to a rich value when the storage quantity of the catalyst decreases, the catalyst could become saturated with a rich component in a relatively short period of time. This rich component just passes through the catalyst. Thus, by setting the target air-fuel ratio at a new value dependent on a computed value of the storage quantity obtained in the immediately preceding calculation, the target air-fuel ratio can be set at a value appropriate for the current storage quantity. As a result, even if the storage quantity decreases to a small value, the small value of the storage quantity can be calculated without worsening emission of exhaust gas.

In another aspect, the storage quantity is computed by correction of the target air-fuel ratio depending on the flow rate of intake air. At a fixed target air-fuel ratio, the larger the flow rate of intake air, the flow rate of exhaust gas, the greater the quantity of a rich component flowing into the catalyst and, hence, the shorter the time to catalyst saturation with the rich component. Thus, by correcting the target air-fuel ratio according to the flow rate of intake air, that is, by setting the target air-fuel ratio at a value appropriate for the flow rate of intake air, the value of the storage quantity can be calculated without lowering emission of exhaust gas even if the storage quantity decreases to a small value.

In another aspect, the storage quantity is calculated by correcting a feedback control gain of the air-fuel ratio depending on the flow rate of intake air. Here, the response of the feedback control of the air-fuel ratio, that is, the follow-up characteristic, can be changed according to the flow rate of intake air. In another aspect, the storage quantity is calculated at low load, such as idle. At low load, the exhaust gas flow rate decreases so that a temporary change in target air-fuel ratio does not have an adverse effect on the exhaust gas emission.

In another aspect, an abnormality other than a deteriorating state of the catalyst is detected based on a computed value of the storage quantity. The system described above can be applied systems having one or more catalysts on the upstream and downstream sides of the exhaust gas path. Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
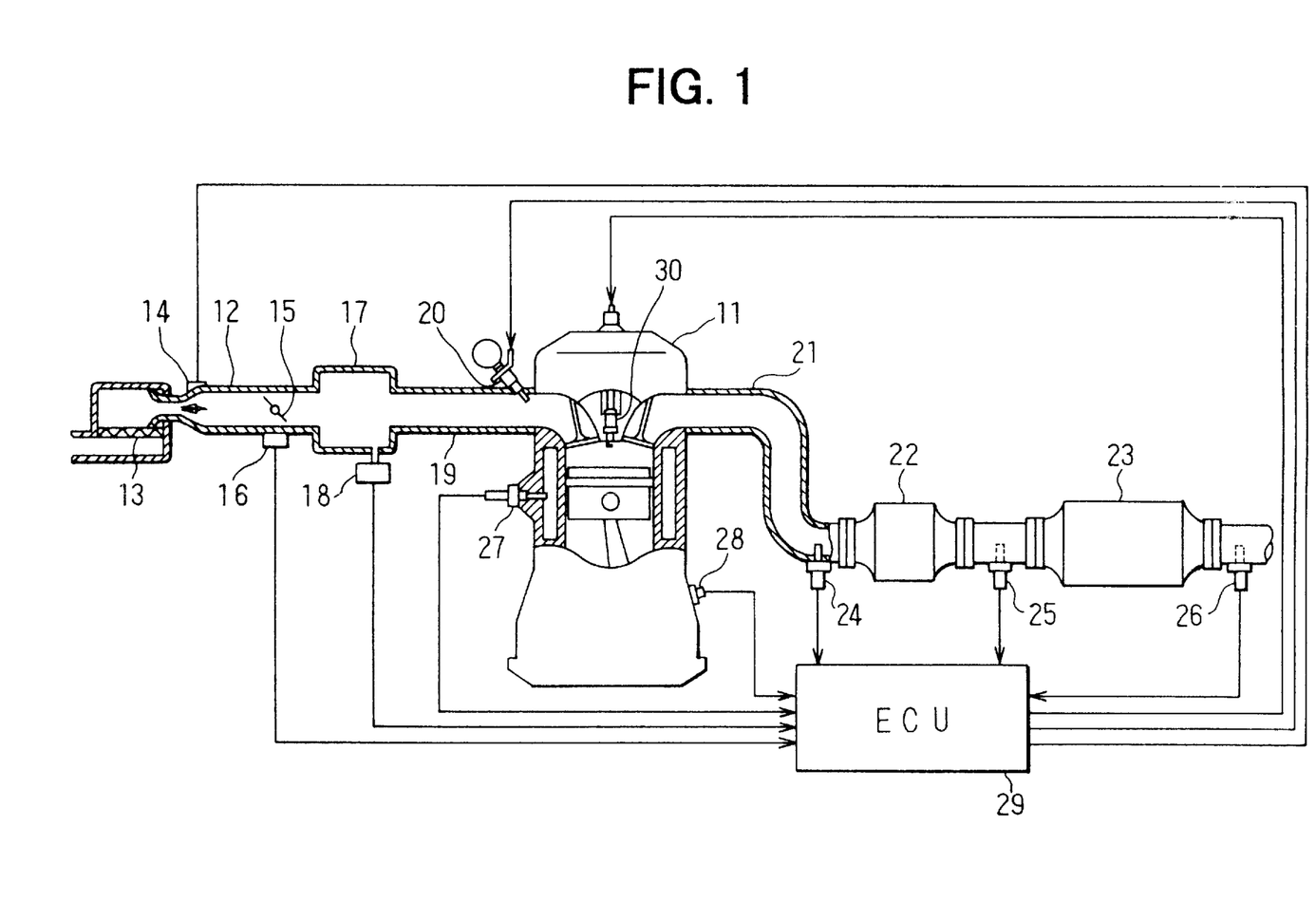
FIG. 1 is a partial cross-sectional view showing a complete engine control system for a catalyst deteriorating state detecting apparatus according to the present invention.

In FIG. 1, an air cleaner 13 is provided at the uppermost portion of an intake pipe 12 of an internal combustion engine 11. An airflow meter 14 for detecting the flow rate of intake air is installed on the downstream side of the air cleaner 13. A throttle valve 15 and a throttle angle sensor 16 are provided on the downstream side of the airflow meter 14. The throttle angle sensor 16 is used to detect the angle of the throttle valve 15.

A surge tank 17 is further provided on the downstream side of the throttle valve 15. An intake-pipe-pressure sensor 18 for detecting an intake-pipe pressure is provided on the surge tank 17. In addition, an intake manifold 19 for introducing air into cylinders of engine 11 is provided on the surge tank 17. A fuel injection valve 20 for injecting fuel is provided at a location in close proximity to an intake port of the intake manifold 19.

In the middle of an exhaust pipe (or exhaust-gas path) 21 of the engine 11, on the other hand, there is an upstream catalyst 22 and a downstream catalyst 23, which reduces hazardous components contained in the exhaust gas. Examples of hazardous components include CO, HC and NOx. The upstream catalyst 22 has a relatively small capacity for reducing engine-start exhaust gas emission upon completion of an engine warming-up during engine starting. The downstream catalyst 23 has a relatively large capacity to sufficiently clean exhaust gas even during a large-load region where a large flow rate of exhaust gas is generated. In this embodiment, the ratio of the capacity of the upstream catalyst 22 to the capacity of the downstream catalyst 23 is set at a typical value of 1/2.

Air-fuel ratio sensor 24 and air-fuel ratio sensor 25 are each used to detect an air-fuel ratio of exhaust gas and are provided on the upstream and downstream sides of the upstream catalyst 22 respectively. On the other hand, an air-fuel ratio sensor 26 for detecting an air-fuel ratio of exhaust gas is provided on the downstream side of the downstream catalyst 23. A water-temperature sensor 27 for detecting the temperature of cooling water and a crank angle sensor 28 for detecting the rotational speed of the engine 11 are provided on the cylinder block of the engine 11.

Signals generated by this variety of sensors are supplied to an engine control circuit 29, which is also referred to hereafter as an ECU (Electronic Control Unit). The ECU 29 is configured based on a microcomputer serving as a core component. The microcomputer executes a fuel injection control program stored in an embedded ROM, used as a storage medium, to control the flow rate of fuel injected by the fuel injection valve 20 according to the operating state of the engine 11. The microcomputer also executes an ignition control program stored in the ROM to control the ignition timing of an ignition plug 30.

Figure 2:
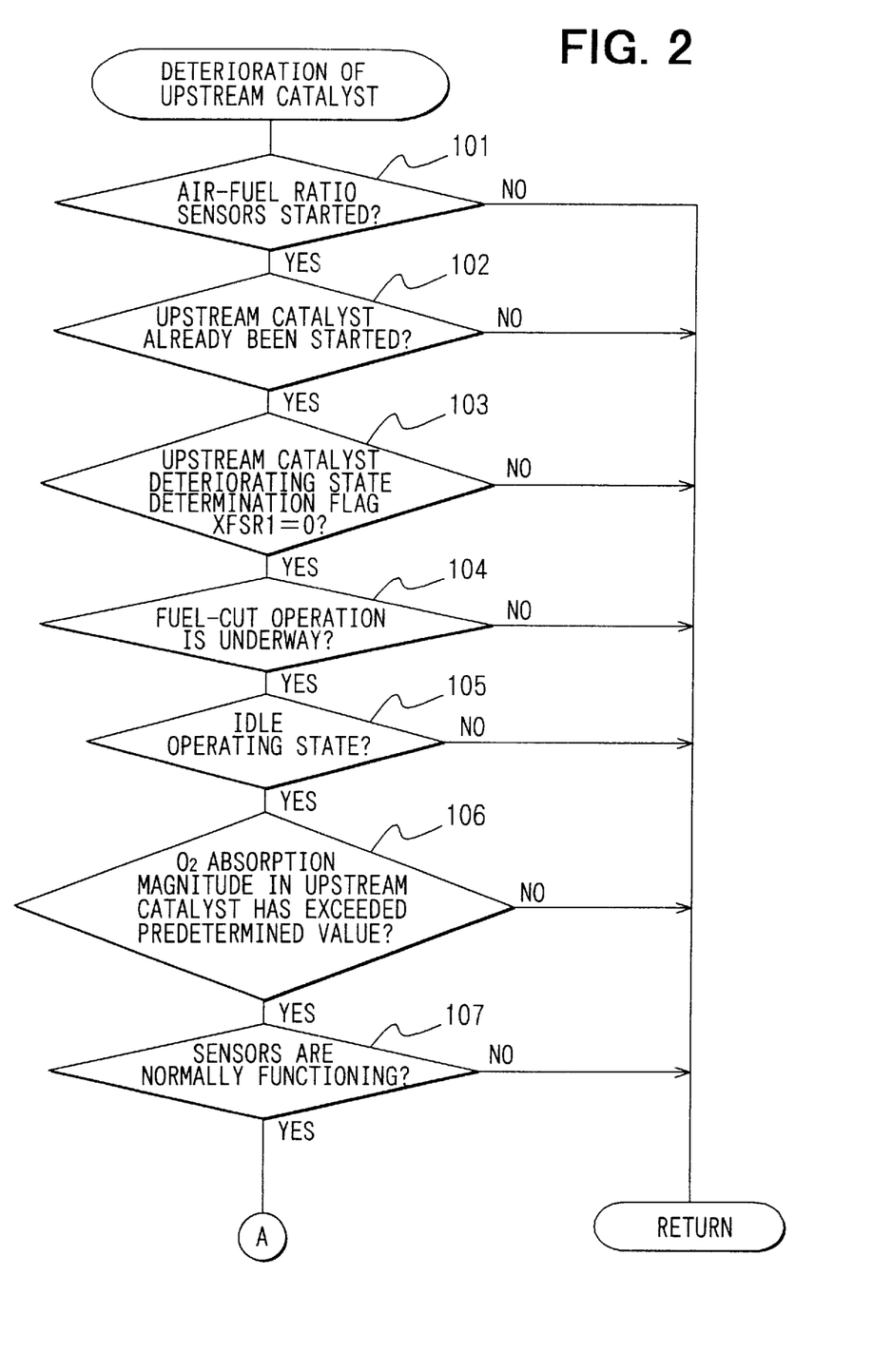
FIG. 2 shows a flowchart for processing of an upstream catalyst deteriorating state determining program for a catalyst deteriorating state detecting apparatus according to the present invention.
Figure 3:
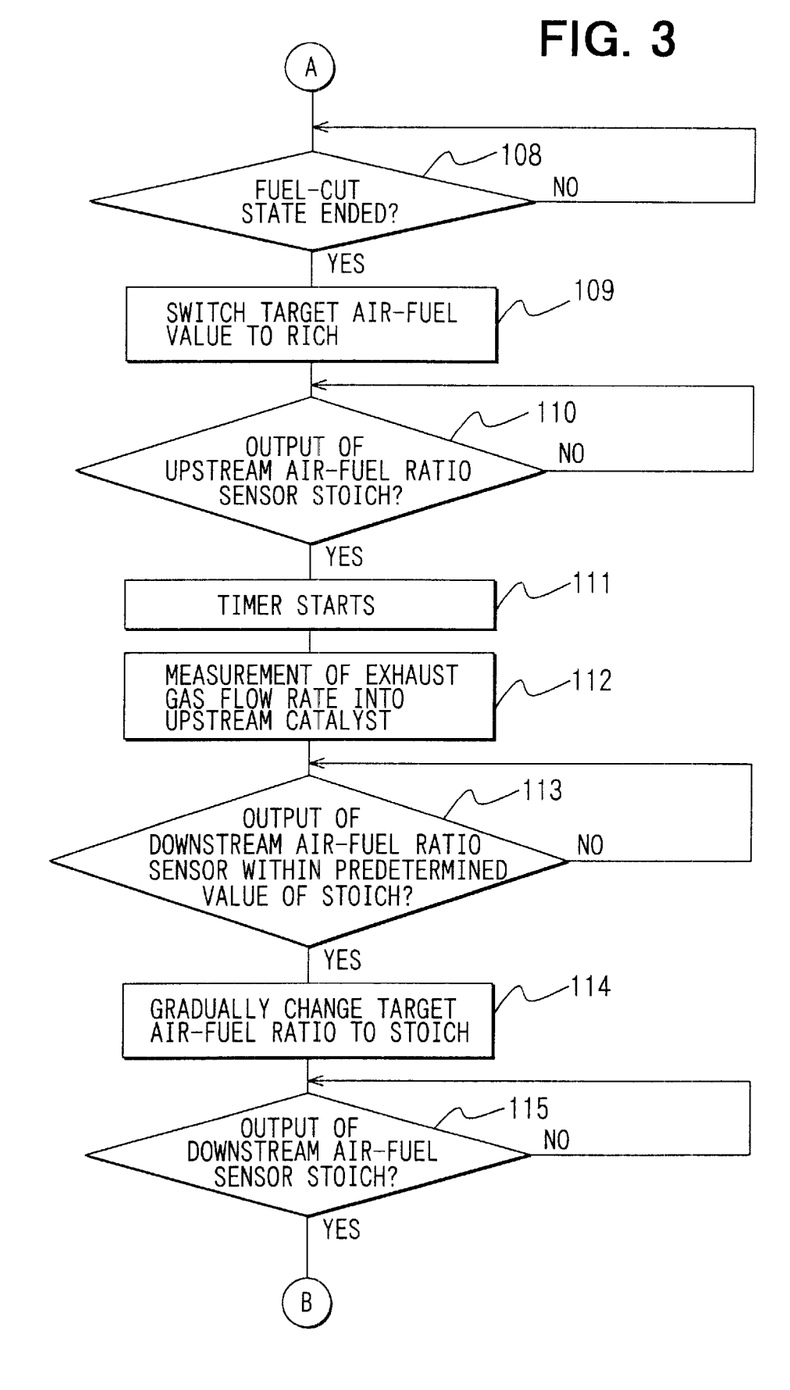
FIG. 3 is a flowchart for processing the upstream catalyst deteriorating state determining program for a catalyst deteriorating state detecting apparatus according to the present invention.
Figure 4:
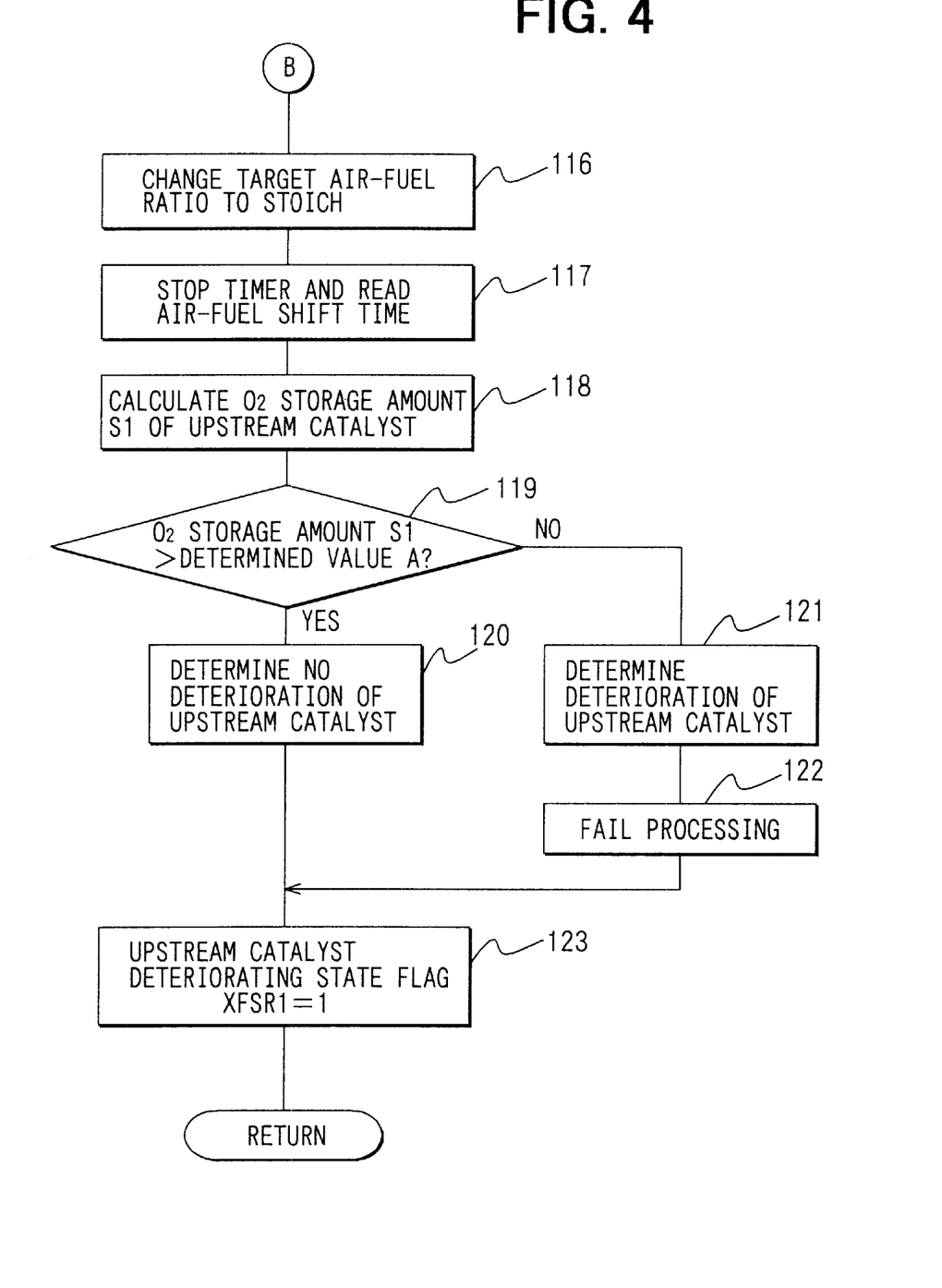
FIG. 4 is a flowchart for processing the upstream catalyst deteriorating state determining program for a catalyst deteriorating state detecting apparatus according to the present invention.

In addition, the ECU 29 executes an upstream catalyst deteriorating state determining program of FIGS. 2 to 4, also stored in the ROM, to compute a storage quantity of $O_2$ in the upstream catalyst 22 used for determining whether or not the upstream catalyst 22 has deteriorated. Also, ECU 29 executes a downstream catalyst deteriorating state determining program of FIG. 10 stored in the ROM to compute a storage quantity of $O_2$ in the downstream catalyst 23 used for determining whether or not the downstream catalyst 23 has deteriorated.

Figure 5:
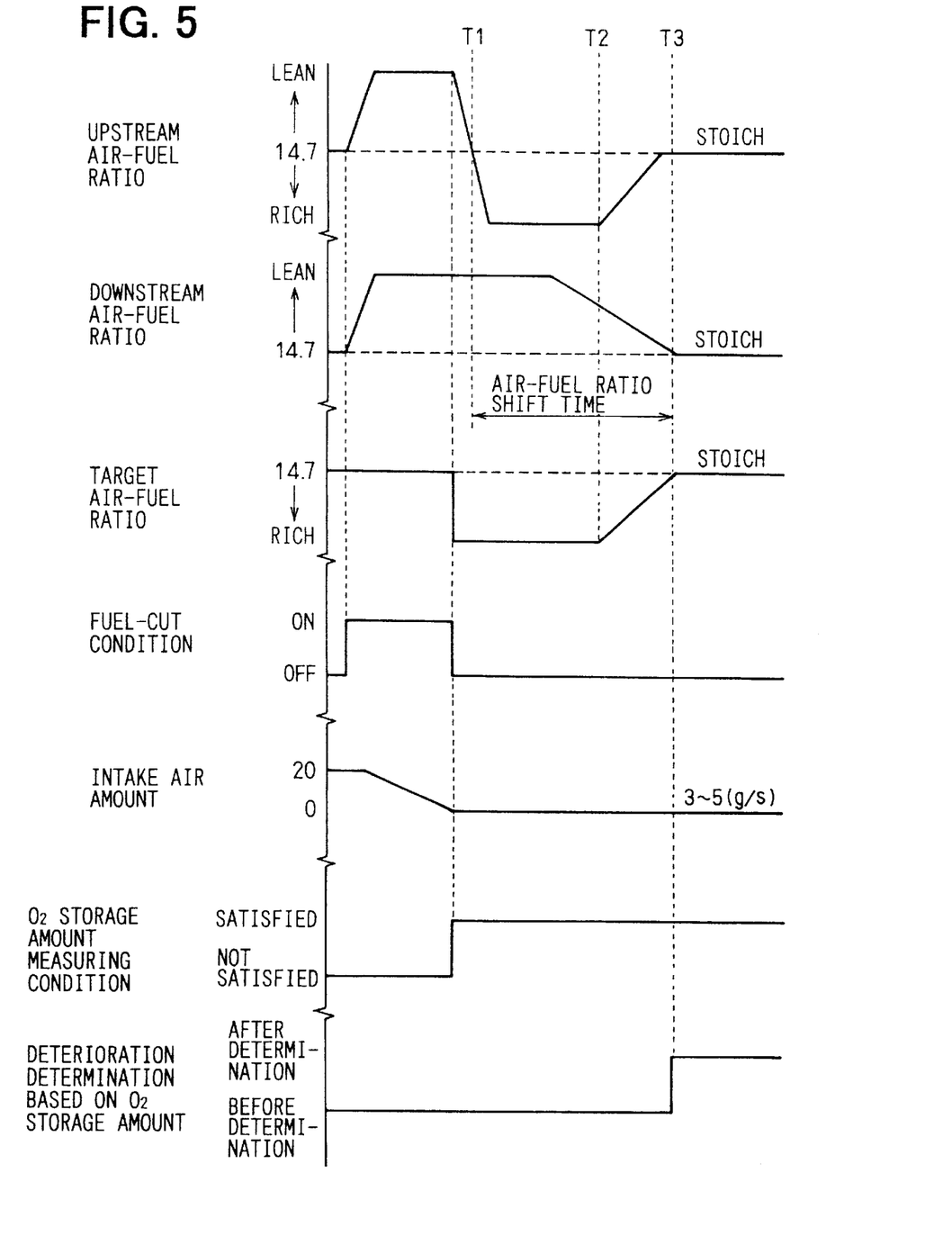
FIG. 5 is a time chart for measuring a storage quantity of $O_2$ in a catalyst for a catalyst deteriorating state detecting apparatus according to the present invention.

The following description explains how to compute a storage quantity of $O_2$ in the upstream catalyst 22 by referring to FIG. 5. Here, a storage quantity of $O_2$ is computed in the upstream catalyst 22 by switching a target air-fuel ratio to a rich value right after the end of a fuel-cut state. That is, in a fuel-cut state, the air-fuel ratio of exhaust gas flowing into the upstream catalyst 22 is lean. Thus, during a long fuel-cut state, the magnitude of absorption of a lean component such as $O_2$ in the upstream catalyst 22 during the fuel-cut state enters a saturated state and the magnitude of the saturated absorption of $O_2$ becomes the storage quantity of $O_2$ in the upstream catalyst 22.

With the absorption magnitude of a lean component becoming saturated, the air-fuel ratio on the downstream side of the upstream catalyst 22 also becomes lean like the upstream side, as shown in FIG. 5. If the target air-fuel ratio is switched to a rich value right after the end of the fuel cut in this saturated state, the air-fuel ratio of exhaust gas emitted by the engine 11 exceeds the stoichiometric air-fuel ratio, and starts changing to a rich value. Even if the target air-fuel ratio is switched to a rich value, the rich component of exhaust gas flowing into the upstream catalyst 22 is entirely absorbed in the upstream catalyst 22 to clean the exhaust, making the air-fuel ratio on the downstream side of the upstream catalyst 22 remaining at a lean value. For this reason, the air-fuel ratio on the downstream side of the upstream catalyst 22 changes toward the stoichiometric air-fuel ratio, slightly lagging behind the change on the upstream side, to exceed the stoichiometric air-fuel ratio at time T1 toward a rich value as shown in FIG. 5.

If rich gas continues to flow into the upstream catalyst 22, $O_2$ absorbed by the upstream catalyst 22 is consumed and the absorption of $O_2$ in the upstream catalyst 22 soon approaches 0. At T3, the downstream air-fuel ratio equals the stoichiometric air-fuel ratio.

Thus, between T1 and T3, where T1 is when rich gas starts flowing into upstream catalyst 22 and T3 is where the downstream air-fuel ratio becomes equal to the stoichiometric air-fuel ratio, the quantity of the rich component is calculated and the result is the storage quantity of $O_2$ in the upstream catalyst 22. This calculated quantity is that required to consume all $O_2$ absorbed by the upstream catalyst 22 in the fuel-cut state. The quantity of the rich component in the exhaust gas flowing to the upstream catalyst 22 during the period of time between T1 and T3, that is, the storage quantity of $O_2$, is calculated from the flow rate of the exhaust gas flowing to the upstream catalyst 22 during the period of time between T1 and T3 and a change in target air-fuel ratio.

The storage quantity of $O_2$ in the upstream catalyst 22 is calculated by executing the upstream catalyst deteriorating state determining program (represented by the flowchart shown in FIGS. 2 to 4). The upstream catalyst deteriorating state determining program is executed after the engine 11 is started at predetermined time intervals or at predetermined crank angle intervals. When this program is invoked, the flowchart begins with steps 101 to 107 (shown in FIG. 2) to determine whether measurement conditions of the storage quantity of $O_2$ in the upstream catalyst 22 or determining a deteriorating state of the upstream catalyst 22, are satisfied as follows. The process starts at step 101 to determine whether the air-fuel ratio sensor 24 and the air-fuel ratio sensor 25 are started. If these sensors are not started, the air-fuel ratios on the upstream and downstream sides of the upstream catalyst 22 cannot be detected with a high degree of accuracy.

If these sensors are started, step 102 determines whether the upstream catalyst 22 has been activated. If the upstream catalyst 22 has not been activated, the storage quantity of $O_2$ in the upstream catalyst 22 cannot be measured with a high degree of accuracy.

If the upstream catalyst 22 has already been activated, step 103 determines whether an upstream catalyst deteriorating state determination flag XFSR1 is 0. This indicates whether determining a deteriorating state of the upstream catalyst 22 has not been completed yet for the current operation. The upstream catalyst 22 does not deteriorate instantaneously in just one operation. Thus, a deteriorating state of the upstream catalyst 22 is determined only once in one operation.

If the determination of a deteriorating state of the upstream catalyst 22 has not been completed, step 104 determines whether a fuel-cut operation is underway. In a fuel-cut state, $O_2$ in exhaust gas is absorbed into the upstream catalyst 22 to make the absorption magnitude of $O_2$ in the upstream catalyst 22 saturated.

Figure 6:
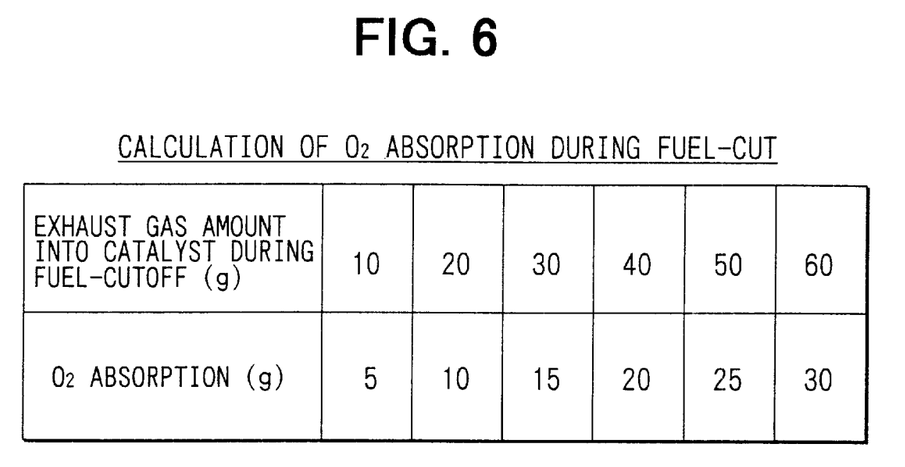
FIG. 6 is a table for computing storage quantity of $O_2$ in a fuel-cut state for a catalyst deteriorating state detecting apparatus according to the present invention.

If a fuel-cut operation is underway, step 105 determines whether the present load is light, such as during idle of engine 11. If the load is light, the flow rate of exhaust gas is small so that, even if the target air-fuel ratio is changed temporarily, emission of exhaust gas will not be affected. If the load is light, step 106 determines whether the absorption magnitude of $O_2$ in the upstream catalyst 22 has exceeded a predetermined value or the saturated level. To compute the absorption magnitude of $O_2$ in the upstream catalyst 22, the flow rate of exhaust gas flowing into the upstream catalyst 22 since the start of the fuel-cut state is calculated. The flow rate of exhaust gas is found as a product of an average flow rate of intake air and the duration of the fuel-cut state. The absorption magnitude of $O_2$ in the upstream catalyst 22 is then computed from the calculated flow rate of exhaust gas by using a data table shown in FIG. 6 or a formula. If the absorption magnitude of $O_2$ in the upstream catalyst 22 has not exceeded the predetermined value or the saturated level, the absorption magnitude of $O_2$ in the upstream catalyst 22 cannot be measured with a high degree of accuracy. Thus, an absorption magnitude of $O_2$ in the upstream catalyst 22 exceeding the predetermined value is set as a condition for measurement of a storage quantity of $O_2$.

If the absorption magnitude of $O_2$ in the upstream catalyst 22 exceeds the predetermined value, step 107 determines whether each of the sensors is functioning normally. This step avoids incorrect determinations.

Figure 7:
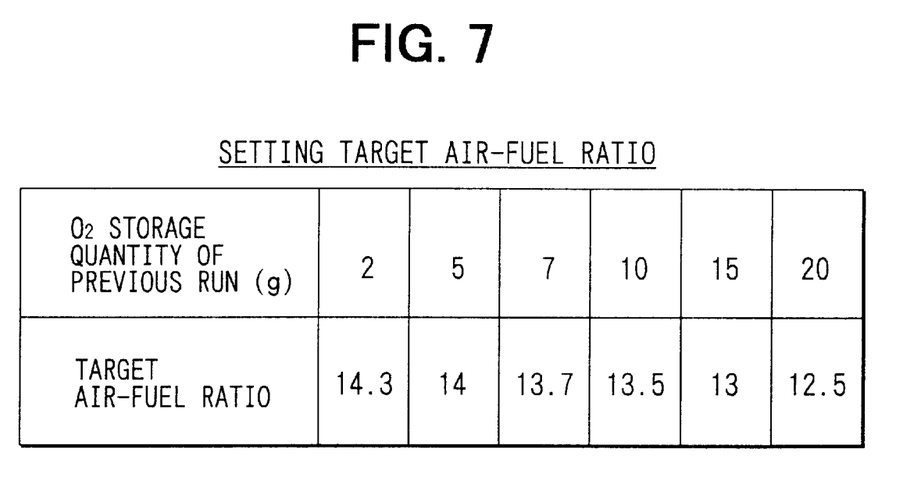
FIG. 7 is a data table for setting a target air-fuel ratio according to a storage quantity of $O_2$ calculated in an immediately preceding run for a catalyst deteriorating state detecting apparatus according to the present invention.

A YES result from any of steps 101 to 107 indicates that the condition for measuring a storage quantity of $O_2$ is satisfied. In this case, step 108 of the flowchart shown in FIG. 3 waits for the fuel-cut state to end. After ending, the measurement of the storage quantity of $O_2$ is started. First, at step 109, the target air-fuel ratio is switched to a rich value. This value may be a predetermined value or a target air-fuel ratio computed by using a storage quantity of $O_2$ calculated in the preceding running operation from the data table shown in FIG. 7 or a formula.

Figure 8:
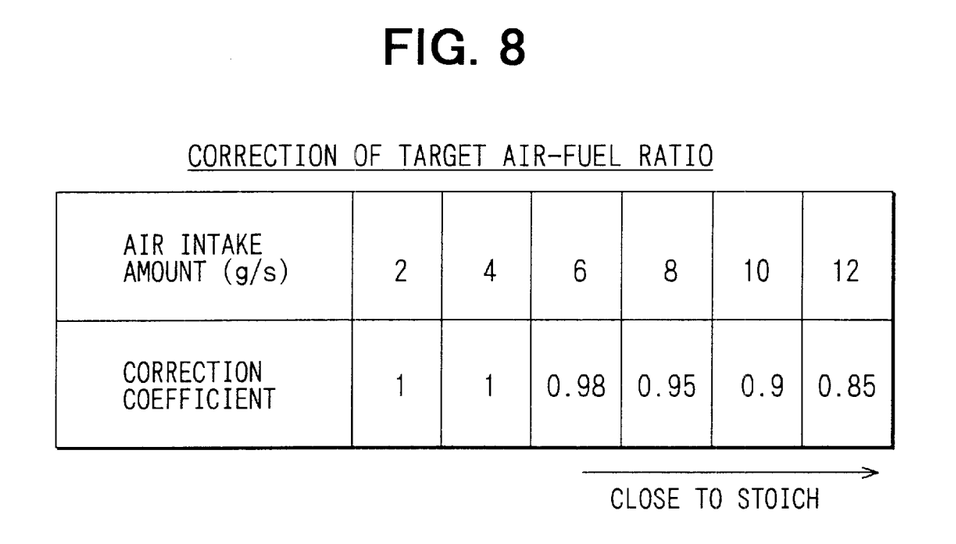
FIG. 8 is a table for determining a correction coefficient of a target air-fuel ratio according to a flow rate of intake air for a catalyst deteriorating state detecting apparatus according to the present invention.

In this case, the predetermined target air-fuel ratio or the target air-fuel ratio computed by using a storage quantity of $O_2$ calculated in the preceding running operation may be corrected according to the flow rate of intake air. The target air-fuel ratio is typically corrected by multiplying the current target air-fuel ratio by a correction coefficient shown in the data table of FIG. 8. The correction coefficient used in the multiplication is selected according to the flow rate of intake air. A product of the current target air-fuel ratio and the correction coefficient is used as a final target air-fuel ratio. Since the final target air-fuel ratio is obtained by correction according to the flow rate of intake air in this way, a target air-fuel ratio appropriate for the flow rate of intake air can be set. Thus, even if the storage quantity of $O_2$ decreases, the storage quantity of $O_2$ can be measured without worsening emission of exhaust gas.

Figure 9:
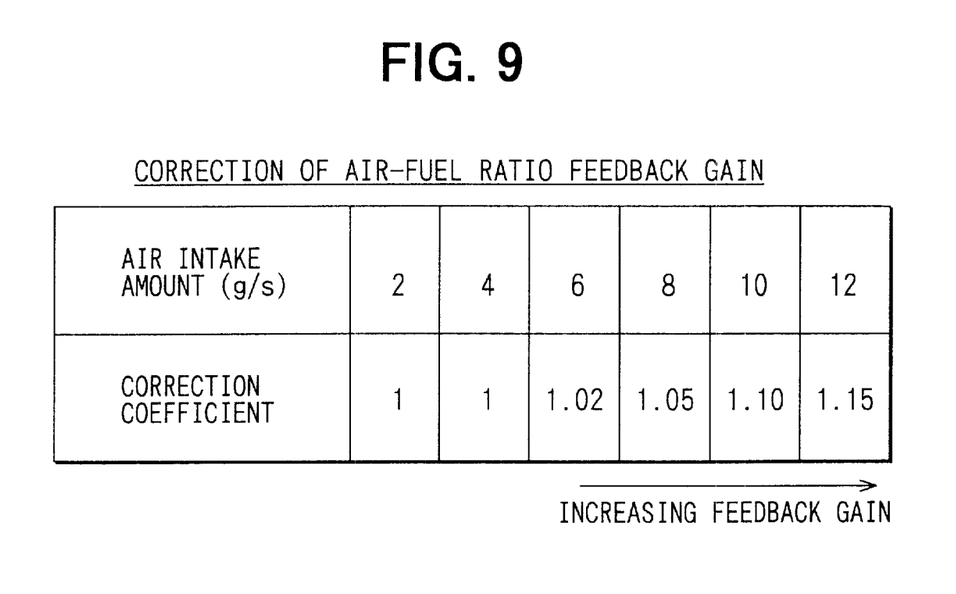
FIG. 9 is a table for determining a correction coefficient of an air-fuel ratio feedback gain according to intake air flow rate for a catalyst deteriorating state detecting apparatus according to the present invention.

It should be noted that the gain of the air-fuel ratio feedback control can be corrected according to the flow rate of intake air. The gain is typically corrected by multiplying the current gain by one of the correction coefficients shown in a data table of FIG. 9. The correction coefficient used in the multiplication is selected according to the flow rate of intake air. A product of the current gain and the correction coefficient is used as a final gain. Since the final gain is obtained by correction according to the flow rate of intake air in this way, the greater the flow rate of intake air, the faster the response of the air-fuel ratio (or the characteristic to follow up the target air-fuel ratio).

If the target air-fuel ratio is switched to a rich value right after the end of a fuel-cut state, the air-fuel ratio of exhaust gas emitted by the engine 11 also changes to a rich value. Thus, a signal output by the air-fuel ratio sensor 24 on the upstream side of the upstream catalyst 22 starts to change toward the stoichiometric air-fuel ratio side as shown in FIG. 5. Then, at T1, the signal output by the air-fuel ratio sensor 24 reaches the stoichiometric air-fuel ratio as detected at step 110, step 111 where a timer is started. At step 112, the flow rate of exhaust gas flowing into the upstream catalyst 22 or intake air is measured.

Even if the target air-fuel ratio is switched to a rich value, the rich component of exhaust gas flowing into the upstream catalyst 22 is entirely absorbed in the upstream catalyst 22 clean the exhaust so the downstream air-fuel ratio remains at a lean value. For this reason, the air-fuel ratio on the downstream side of the upstream catalyst 22 starts to change toward the stoichiometric air-fuel ratio, slightly lagging behind the upstream air-fuel ratio change to exceed the stoichiometric air-fuel ratio at time T1 toward a rich value as shown in FIG. 5.

Then, at time T2 a signal output by the air-fuel ratio sensor 25 enters a range within a predetermined distance from the stoichiometric air-fuel ratio as detected at a step 113, and at step 114 the target air-fuel ratio is changed to the stoichiometric air-fuel ratio gradually. As a result, the air-fuel ratio on the downstream side of the upstream catalyst 22 is prevented from exceeding the stoichiometric air-fuel ratio and overshooting to a rich value.

Later on, at time T3, a signal output by the air-fuel ratio sensor 25 reaches the stoichiometric air-fuel ratio as detected by processing carried out at a step 115, step 116 of the flowchart shown in FIG. 4. At the step 116, the timer is stopped. At the next step 117, the air-fuel ratio shift time T1 to T3 is read in. Then, at the next step 118, a storage quantity Si of $O_2$ in the upstream catalyst 22 is computed by using the following formula:

$$S1=(14.7-\text{Target air-fuel ratio})\times\text{Exhaust gas flow rate average value}\times\text{air-fuel ratio shift time}$$

The product (Exhaust gas flow rate average value × air-fuel ratio shift time) on the right-hand side of the above equation corresponds to the flow rate of exhaust gas flowing to the upstream catalyst 22. That is, the quantity of the rich component of exhaust gas flowing into the upstream catalyst 22 during the air-fuel ratio shift time T1 to T3 is computed and used as a storage quantity S1 of $O_2$ in the upstream catalyst 22. T1 is a when the rich gas starts flowing into the upstream catalyst 22. T3 is when the air-fuel ratio on the downstream side of the upstream catalyst 22 reaches the stoichiometric air-fuel ratio. The quantity of the rich component of exhaust gas flowing into the upstream catalyst 22 during the air-fuel ratio shift time T1 to T3 is the quantity required for consuming all $O_2$ absorbed by the upstream catalyst 22.

At step 119, the storage quantity S1 of $O_2$ in the upstream catalyst 22 is compared with a determination value A. If the storage quantity S1 of $O_2$ in the upstream catalyst 22 is greater than the determination value A, at step 120 the upstream catalyst 22 is determined to have not deteriorated. At next step 123, the upstream catalyst deteriorating state determination flag XFRS1 is set to 1 to indicate that the determination of a deteriorating state has been completed. The program then ends.

If the storage quantity S1 of $O_2$ in the upstream catalyst 22 is, equal to or smaller than the determination value A, at step 121 the upstream catalyst 22 is determined to have deteriorated. At step 122, an alarm lamp blinks and fail processing stores an abnormality code. At the next step 123, the upstream catalyst deteriorating state determination flag XFRS1 is set at 1 to indicate that the determination of a deteriorating state has been completed. This program is then ended. It should be noted that the processing carried out at steps 119 to 121 correspond to operation of a deteriorating state determining means cited according to an aspect of this patent specification.

Next, a method for determining a deteriorating state of the downstream catalyst 23 is explained. As described above, the upstream catalyst 22 is provided on the upstream side of the downstream catalyst 23. Thus, affected by the upstream catalyst 22, the air-fuel ratio on the upstream side of the downstream catalyst 23 varies. As a result, a storage quantity S2 of $O_2$ in the downstream catalyst 23 cannot be calculated by using the same method as the upstream catalyst 22.

For this reason, the upstream catalyst 22 and the downstream catalyst 23 are regarded as a single catalyst and a total storage quantity Stotall representing the sum of the storage quantity S1 of the upstream catalyst 22 and the storage quantity S2 of the downstream catalyst 23 is calculated. The storage quantity S2 of the downstream catalyst 23 is then found by subtracting the storage quantity S1 of the upstream catalyst 22 from the total storage quantity Stotall. The storage quantity S2 is used as a basis for determining whether the downstream catalyst 23 has deteriorated. A downstream catalyst deteriorating state determining program executed to carry out this processing is explained by referring to a flowchart shown in FIG. 10.

Figure 10:
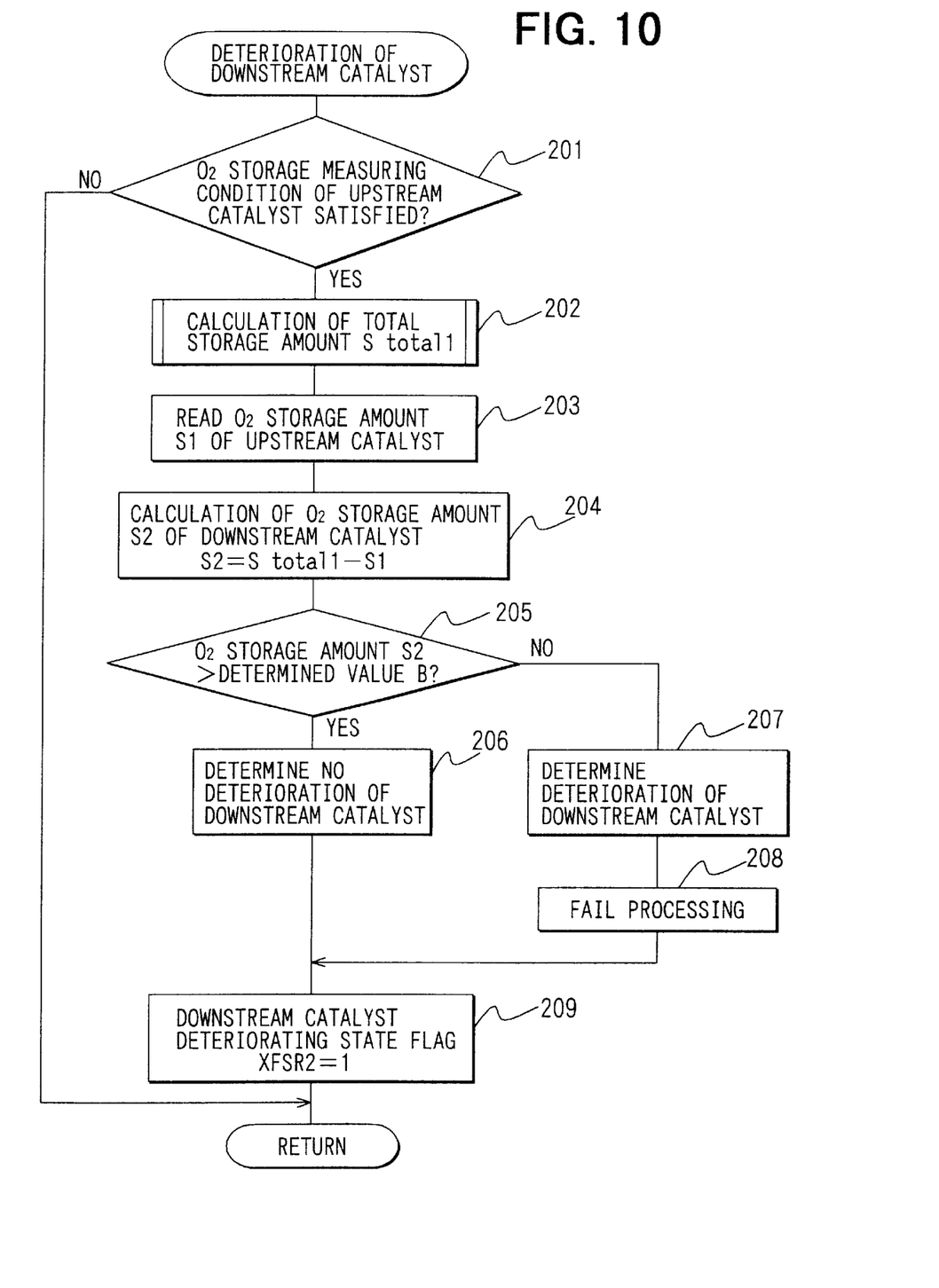
FIG. 10 is a flowchart representing the processing of a downstream catalyst deteriorating state determining program for a catalyst deteriorating state detecting apparatus according to the present invention.

The downstream catalyst deteriorating state determining program with its flowchart, shown in FIG. 10 is executed after the engine 11 is started at predetermined time intervals or at predetermined crank angle intervals. As shown in FIG. 10, the flowchart begins with a step 201 to determine whether conditions for measuring the storage quantity S1 of $O_2$ in the upstream catalyst 22 are satisfied. These conditions are the same as for the steps 101 to 107 of the flowchart shown in FIG. 9.

If the conditions for measuring the storage quantity S1 of $O_2$ in the upstream catalyst 22 are satisfied, at step 202 Stotall is calculated, at which the upstream catalyst 22 and the downstream catalyst 23 are regarded as a single catalyst and a total storage quantity Stotall represents the sum of the storage quantity S1 of the upstream catalyst 22 and the storage quantity S2 of the downstream catalyst 23. The total storage quantity Stotall is calculated the same as for steps 108 to 118 to compute the storage quantity S1 of $O_2$ in the upstream catalyst 22. The processing carried out at step 202 corresponds to another role played by the storage amount computing means cited in an aspect of this patent specification.

At step 203, the storage quantity S1 of $O_2$ in the upstream catalyst 22, computed at step 118 of the flowchart shown in FIG. 4, is read in. At step 204, the storage quantity S2 of the downstream catalyst 23 is found by subtracting the storage quantity S1 of the upstream catalyst 22 from the total storage quantity Stotall representing the sum of the storage quantity S1 of the upstream catalyst 22 and the storage quantity S2 of the downstream catalyst 23.

Later on, at step 205, the storage quantity S2 of $O_2$ in the downstream catalyst 23 is compared with a criterion value B. If the storage quantity S2 of $O_2$ in the downstream catalyst 23 is greater than the criterion value B, at step 206 the downstream catalyst 23 is determined to have not deteriorated. At step 209, a downstream catalyst deteriorating state determination flag XFRS2 is set to 1 to indicate that a determination of a deteriorating state has been completed. The program then ends.

If the storage quantity S2 of $O_2$ in the downstream catalyst 23 is equal to or smaller than the criterion value B, at step 207 the downstream catalyst 23 is determined to have deteriorated. At the next step 208, an alarm lamp blinks and a fail processing stores an abnormality code. At step 209, the downstream catalyst deteriorating state determination flag XFRS2 is set at 1 to indicate completing the determination of a deteriorating state. The program then ends.

After the fuel-cut state ends, the target air-fuel ratio is switched to a rich value and the storage quantities S1 and S2 of $O_2$ in the upstream catalyst 22 and the downstream catalyst 23 respectively are computed Thus, the storage quantities S1 and S2 of $O_2$ in the upstream catalyst 22 and the downstream catalyst 23 can be computed with the air-fuel ratio of exhaust gas changed to a rich value. Specifically, this improves the efficiency of exhaust gas cleaning. As a result, storage quantities S1 and S2 of $O_2$ or to detect deteriorating state of the upstream catalyst 22 and the downstream catalyst 23 respectively can be calculated without worsening emission of exhaust gas.

However, in the present invention, the storage quantity of $O_2$ can be computed or a deteriorating state can be detected with timing other than after the end of a fuel-cut state. For example, the air-fuel ratio of exhaust gas where the absorption magnitude of $O_2$ in a catalyst is changed to rich, to clean the exhaust gas, the storage quantity of $O_2$ is computed. As an alternative, the air-fuel ratio of exhaust gas where the absorption magnitude of a rich component such as HC in a catalyst is changed to a rich value, the storage quantity of the rich component is computed. In either case, it is possible to compute a storage quantity in a catalyst without worsening emission of exhaust gas.

In addition to the sensors disclosed in this invention, HC and NOx sensors may also be used. Moreover, the present invention can be used to detect sensor abnormality, a catalyst clogging state or the like based on a computed value of the storage quantity in a catalyst. For example, a computed value of the storage quantity greater than for a new catalyst indicates a conceivable state of the catalyst. As a note, the present invention can be used with only one catalyst installed in the exhaust pipe.

While the above-described embodiments refer to examples of-usage of the present invention, it is understood that the present invention may be applied to other usage, modifications and variations of the same, and is not limited to the disclosure provided herein.

What is claimed is:

1. A catalyst deteriorating state detecting apparatus for detecting a deteriorating state of a catalyst provided in an exhaust-gas path from an internal combustion engine, comprising:

an upstream sensor that detects an air-fuel ratio or exhaust gas concentration flowing through the exhaust-gas path, said upstream sensor being positioned upstream of the catalyst;

a downstream sensor that detects an air-fuel ratio or exhaust gas concentration, said downstream sensor being positioned downstream of said catalyst;

a storage amount computing device that calculates a storage quantity of the catalyst based on a flow rate of the exhaust gas flowing into the catalyst during a change in output generated by a downstream sensor due to a variation in a target air-fuel ratio; and a deteriorating state determining device that determines whether a deteriorating state of the catalyst exists based on the storage quantity calculated by the storage amount computing device.

2. A catalyst deteriorating state detecting apparatus according to claim 1, wherein the storage amount computing device calculates the storage quantity of the catalyst based on a flow rate of the exhaust gas flowing into the catalyst during a change in output generated by a downstream sensor due to a variation in target air-fuel ratio, said storage amount computing device calculating the storage quantity also based on the variation in target air-fuel ratio.

3. A catalyst deteriorating state detecting apparatus for detecting a deteriorating state of a catalyst provided in an exhaust-gas path from an internal combustion engine, comprising:

an upstream sensor that detects an air-fuel ratio or exhaust gas concentration flowing through the exhaust-gas path, said upstream sensor being positioned upstream of the catalyst;

a downstream sensor that detects an air-fuel ratio or exhaust gas concentration, said downstream sensor being positioned downstream of said catalyst;

a storage amount computing device that calculates a storage quantity of the catalyst based on a flow rate of the exhaust gas flowing into the catalyst during a change in output generated by a downstream sensor due to a variation in a target air-fuel ratio; and a deteriorating state determining device that determines whether a deteriorating state of the catalyst exists based on the storage quantity calculated by the storage amount computing device;

wherein the storage amount computing means calculates a storage quantity of a catalyst by switching the target air-fuel ratio to a rich value after an end of a fuel-cut state.

4. A catalyst deteriorating state detecting apparatus according to claim 3, wherein the storage amount computing device calculates the storage quantity of the catalyst after the end of the fuel-cut state when a magnitude of absorption of a lean component in the catalyst during the fuel-cut state has attained or exceeded a predetermined value.

5. A catalyst deteriorating state detecting apparatus according to claim 1, wherein the storage amount computing device calculates the storage quantity of the catalyst by setting the target air-fuel ratio at a new value dependent on a computed value of the storage quantity obtained in a preceding calculation of the storage quantity.

6. A catalyst deteriorating state detecting apparatus according to claim 1, wherein the storage amount computing device calculates the storage quantity of the catalyst by correction of the target air-fuel ratio depending on a flow rate of intake air.

7. A catalyst deteriorating state detecting apparatus according to claim 1, wherein the storage amount computing device calculates the storage quantity of the catalyst by correcting a gain of feedback control of the air-fuel ratio depending on a flow rate of intake air.

8. A catalyst deteriorating state detecting apparatus as claimed in claim 1, wherein the storage amount computing device calculates the storage quantity of the catalyst for an idle or low load of the internal combustion engine.

9. A catalyst deteriorating state detecting apparatus for detecting a deteriorating state of a catalyst provided in an exhaust-gas path from an internal combustion engine, comprising:

an upstream sensor that detects an air-fuel ratio or exhaust gas concentration flowing through the exhaust-gas path, said upstream sensor being positioned upstream of the catalyst;

a downstream sensor that detects an air-fuel ratio or exhaust gas concentration, said downstream sensor being positioned downstream of said catalyst;

a storage amount computing device that calculates a storage quantity of the catalyst based on a flow rate of the exhaust gas flowing into the catalyst during a change in output generated by a downstream sensor due to a variation in a target air-fuel ratio; and a deteriorating state determining device that determines whether a deteriorating state of the catalyst exists based on the storage quantity calculated by the storage amount computing device;

wherein an abnormality determining device determines existence or non-existence of an abnormality other than a deteriorating state of the catalyst based on a computed value of the storage quantity produced by the storage amount computing device.

10. A catalyst deteriorating state detecting apparatus for detecting a deteriorating state of a catalyst provided in an exhaust-gas path from an internal combustion engine, comprising:

an upstream sensor that detects an air-fuel ratio or exhaust gas concentration flowing through the exhaust-gas path, said upstream sensor being positioned upstream of the catalyst;

a downstream sensor that detects an air-fuel ratio or exhaust gas concentration, said downstream sensor being positioned downstream of said catalyst;

a storage amount computing device that calculates a storage quantity of the catalyst based on a flow rate of the exhaust gas flowing into the catalyst during a change in output generated by a downstream sensor due to a variation in a target air-fuel ratio;

a deteriorating state determining device that determines whether a deteriorating state of the catalyst exists based on the storage quantity calculated by the storage amount computing device; and an upstream catalyst and downstream catalyst positioned respectively upstream and downstream in the exhaust-gas path of the internal combustion engine, said catalyst having its deteriorating state detected being said upstream catalyst;

wherein the storage amount computing device calculates the storage quantity of the catalyst having its deteriorating state detected based on the downstream sensor.

11. A catalyst deteriorating state detecting apparatus for detecting a deteriorating state of a catalyst provided in an exhaust-gas path from an internal combustion engine, comprising:

an upstream sensor that detects an air-fuel ratio or exhaust gas concentration flowing through the exhaust-gas path, said upstream sensor being positioned upstream of the catalyst;

a downstream sensor that detects an air-fuel ratio or exhaust gas concentration, said downstream sensor being positioned downstream of said catalyst;

a storage amount computing device that calculates a storage quantity of the catalyst based on a flow rate of the exhaust gas flowing into the catalyst during a change in output generated by a downstream sensor due to a variation in a target air-fuel ratio; and a deteriorating state determining device that determines whether a deteriorating state of the catalyst exists based on the storage quantity calculated by the storage amount computing device;

an upstream catalyst and downstream catalyst positioned respectively upstream and downstream of the exhaust-gas path of the internal combustion engine, said catalyst having its deteriorating state detected being said upstream catalyst; and a third sensor that detects an air-fuel ratio or a concentration of exhaust gas flowing through the exhaust-gas path provided downstream of the downstream catalyst;

wherein the storage amount computing device calculates a total storage quantity for the combined upstream catalyst and downstream catalyst.

12. A catalyst deteriorating state detecting apparatus as claimed in claim 11, wherein the storage amount computing device subtracts the computed storage quantity of the upstream catalyst from the computed total storage quantity of the upstream catalyst and downstream catalyst to determine the storage quantity of the downstream catalyst.

13. A method for detecting a deteriorating state of a catalyst provided in an exhaust-gas path from an internal combustion engine, comprising:

sensing an air-fuel ratio or exhaust gas concentration with a downstream sensor, said downstream sensor being positioned downstream of said catalyst;

calculating a storage quantity of the catalyst with a storage amount computing device based on a flow rate of the exhaust gas flowing into the catalyst during a change in output generated by the downstream sensor due to a variation in a target air-fuel ratio; and determining whether a deteriorating state of the catalyst exists with a deteriorating state determining device based on the storage quantity calculated by the storage amount computing device.

14. A method for detecting a deteriorating state of a catalyst provided in an exhaust-gas path from an internal combustion engine, comprising:

sensing an air-fuel ratio or exhaust gas concentration with a downstream sensor, said downstream sensor being positioned downstream of said catalyst;

calculating a storage quantity of the catalyst with a storage amount computing device based on a flow rate of the exhaust gas flowing into the catalyst during a change in output generated by the downstream sensor due to a variation in a target air-fuel ratio; and determining whether a deteriorating state of the catalyst exists with a deteriorating state determining device based on the storage quantity calculated by the storage amount computing device;

wherein calculating a storage quantity of the catalyst is performed by switching the target air-fuel ratio to a rich value after an end of a fuel-cut state.

15. The method as claimed in claim 13, wherein calculating the storage quantity of the catalyst is performed by correcting the target air-fuel ratio depending on a flow rate of intake air.

16. A method for detecting a deteriorating state of a catalyst provided in an exhaust-gas path from an internal combustion engine, comprising:

sensing an air-fuel ratio or exhaust gas concentration with a downstream sensor, said downstream sensor being positioned downstream of said catalyst;

calculating a storage quantity of the catalyst with a storage amount computing device based on a flow rate of the exhaust gas flowing into the catalyst during a change in output generated by the downstream sensor due to a variation in a target air-fuel ratio; and determining whether a deteriorating state of the catalyst exists with a deteriorating state determining device based on the storage quantity calculated by the storage amount computing device;

positioning an upstream catalyst and downstream catalyst respectively upstream and downstream in the exhaust-gas path of the internal combustion engine, said catalyst having its deteriorating state detected being said upstream catalyst; and utilizing the storage amount computing device to calculate a total storage quantity for the combined upstream catalyst and downstream catalyst.

17. The method as claimed in claim 16, further comprising subtracting the computed storage quantity of the upstream catalyst from the computed total storage quantity of the upstream catalyst and downstream catalyst to determine the storage quantity of the downstream catalyst.

18. A catalyst clogging state detecting apparatus for detecting a clogging state of a catalyst provided in an exhaust-gas path from an internal combustion engine, comprising:

an upstream sensor that detects an air-fuel ratio or exhaust gas concentration flowing through the exhaust-gas path, said upstream sensor being positioned upstream of the catalyst;

a downstream sensor that detects an air-fuel ratio or exhaust gas concentration, said downstream sensor being positioned downstream of said catalyst;

a storage amount computing device that calculates a storage quantity of the catalyst based on a flow rate of the exhaust gas flowing into the catalyst during a change in output generated by a downstream sensor due to a variation in a target air-fuel ratio; and a clogging state determining device that determines whether a clogging state of the catalyst exists based on the storage quantity calculated by the storage amount computing device.

19. A method for detecting a clogging state of a catalyst provided in an exhaust-gas path from an internal combustion engine, comprising:

sensing an air-fuel ratio or exhaust gas concentration with a downstream sensor, said downstream sensor being positioned downstream of said catalyst;

calculating a storage quantity of the catalyst with a storage amount computing device based on a flow rate of the exhaust gas flowing into the catalyst during a change in output generated by a downstream sensor due to a variation in a target air-fuel ratio; and determining whether a clogging state of the catalyst exists with a clogging state determining device based on the storage quantity calculated by the storage amount computing device.

* * * * *